(12) United States Patent
Van Linden et al.

(10) Patent No.: US 11,554,332 B2
(45) Date of Patent: Jan. 17, 2023

(54) GAS RECOVERY FROM WASTEWATER

(71) Applicant: TECHNISCHE UNIVERSITEIT DELFT, Delft (NL)

(72) Inventors: Niels Van Linden, Delft (NL); Henricus Lambertus Franciscus Spanjers, Delft (NL); Julius Bernardus Van Lier, Delft (NL)

(73) Assignee: TECHNISCHE UNIVERSITEIT DELFT, Delft (NL)

( * ) Notice: Subject to any disclaimer, the term of this patent is extended or adjusted under 35 U.S.C. 154(b) by 12 days.

(21) Appl. No.: 16/966,193

(22) PCT Filed: Jan. 31, 2019

(86) PCT No.: PCT/NL2019/050058
§ 371 (c)(1),
(2) Date: Sep. 23, 2020

(87) PCT Pub. No.: WO2019/151855
PCT Pub. Date: Aug. 8, 2019

(65) Prior Publication Data
US 2021/0138364 A1    May 13, 2021

(30) Foreign Application Priority Data

Feb. 1, 2018 (NL) ...................................... 2020369
Mar. 5, 2018 (NL) ...................................... 2020528

(51) Int. Cl.
*B01D 19/00* (2006.01)
*B01D 61/44* (2006.01)
(Continued)

(52) U.S. Cl.
CPC ....... *B01D 19/0031* (2013.01); *B01D 61/362* (2013.01); *B01D 61/445* (2013.01);
(Continued)

(58) Field of Classification Search
CPC  B01D 19/0031; B01D 61/362; B01D 61/445; B01D 61/58; C02F 1/20;
(Continued)

(56) References Cited

U.S. PATENT DOCUMENTS 4,969,983 A * 11/1990 Parsi ..................... C02F 1/4695
204/632
2016/0271562 A1* 9/2016 Sparrow .................. B01D 1/00

OTHER PUBLICATIONS

Shuangchen et al. "Experimental study on desorption of simulated solution after ammonia carbon capture using bipolar membrane electrodialysis." International Journal of Greenhouse Gas Control 42: 690-698 (2015).
(Continued)

*Primary Examiner* — Magali P Slawski
*Assistant Examiner* — Brad Gordon
(74) *Attorney, Agent, or Firm* — Nixon Peabody LLP; Ronald I. Eisenstein; Nicole D. Kling

(57) ABSTRACT

The present invention is in the field of a system for gas recovery from wastewater, a method for treating wastewater, and a method wherein ammonia and carbon dioxide are recovered. Typically a wastewater stream is fed into the system, treated and stripped from ammonia and carbon dioxide, and a cleaner stream is released.

6 Claims, 5 Drawing Sheets

(51) Int. Cl.
  *C02F 1/20* (2006.01)
  *C02F 1/469* (2006.01)
  *C02F 1/461* (2006.01)
  *C02F 101/16* (2006.01)
  *B01D 61/36* (2006.01)
  *B01D 61/58* (2006.01)
(52) U.S. Cl.
  CPC ............... *B01D 61/58* (2013.01); *C02F 1/20* (2013.01); *C02F 1/4693* (2013.01); *C02F 2001/46128* (2013.01); *C02F 2101/16* (2013.01); *C02F 2201/46185* (2013.01)
(58) Field of Classification Search
  CPC .......... C02F 1/4693; C02F 2001/46128; C02F 2101/16; C02F 2201/46185
  See application file for complete search history.

(56) References Cited

OTHER PUBLICATIONS

Ali et al. "Coupling of bipolar membrane electrodialysis and ammonia stripping for direct treatment of wastewaters containing ammonium nitrate." Journal of Membrane Science 244(1-2): 89-96 (2004).

Pronk et al. "Treatment of source-separated urine by a combination of bipolar electrodialysis and a gas transfer membrane." Water Science and Technology 53(3): 139-146 (2006).

* cited by examiner

GAS RECOVERY FROM WASTEWATER

CROSS-REFERENCE TO RELATED APPLICATIONS

This application is a 35 U.S.C. § 371 National Phase Entry Application of International Application No. PCT/NL2018/050058 filed Jan. 31, 2019, which designates the U.S. and claims benefit under 35 U.S.C. § 119(a) of N.L. Provisional Application Nos. 2020369 filed Feb. 1, 2018 and U.S. Pat. No. 2,020,528 filed Mar. 5, 2018, the contents of which are incorporated herein by reference in their entireties.

FIELD OF THE INVENTION

The present invention is in the field of a system for gas recovery from wastewater, a method for treating wastewater, and a method wherein ammonia and carbon dioxide are recovered. Typically a wastewater stream is fed into the system, treated and stripped from ammonia and carbon dioxide, and a cleaner water stream is released.

BACKGROUND OF THE INVENTION

Typically wastewater originates from households and industry. It may be collected and transferred to a treatment facility.

Wastewater treatment is aimed at converting wastewater into an aqueous effluent that can be returned to the nature water cycle, or aimed at (direct) reuse of water. The latter is also referred to as water reclamation. A minimal impact on the environment is aimed at. The treatment process typically takes place in a wastewater treatment plant or sewage treatment plant. Typically pollutants are removed or broken down. Various processes may be involved, such as phase separation, sedimentation, filtration, oxidation, polishing, tertiary treatment, and biochemical treatment, such as by using microorganisms. By-products from wastewater treatment plants may also be treated in a wastewater treatment plant.

A contaminant typically found in wastewater is nitrogen, such as in the form of urea, nitrate and nitrite. Excessive discharge of nitrogen (N) leads to eutrophication of receiving surface waters and subsequent deterioration of the aquatic environment. To prevent this, nitrogen compounds in wastewaters are preferably removed before discharge of the water. In various types of wastewater, N is present as ammonium ion ($NH_4^+$) in combination with an ion such as bicarbonate ($HCO_3^-$). In many industrialized areas in the world, $NH_4$ is converted to nitrates and eventually to dinitrogen gas, at the expense of considerable capital costs and energy.

The majority of the produced $NH_3$ is used as fertilizer. As a consequence of use thereof, ultimately $NH_3$ becomes available in waste streams: for example, in manure, urine, and sewage. The total amount of $NH_3$ discharged to domestic sewage treatment plants in 2016 in the Netherlands was about 32 million kilogram, while the amount of $NH_3$ in manure in 2013 was about 471 million kilograms. Current state-of-the-art technologies require at least 11 MJ/kg-$NH_3$ to remove $NH_3$ from wastewater.

A treatment technology used is Anammox. In wastewater containing $NH_4HCO_3$, $NH_4^+$ is biochemically oxidized, forming $N_2$ and $H_2O$. This process requires energy. The application of Anammox finally does not lead to the possibility of resource or energy recovery. Also $CO_2$ may remain in treated water, leading to amongst others acidification.

Ammonium nitrate may be removed from wastewater. However, in such as treatment of wastewater containing $NH_4NO_3$ species, the $NH_4NO_3$ can unfortunately not be reused in certain cases because it contains traces of radioactive compounds.

For $(NH_4)_2SO_4$ fertilizer production initially $CO_2$ may be stripped and released into the air to increase the pH and lower the buffer capacity. Subsequently, $NH_3$ gas is stripped, requiring significant amounts of energy and the addition of chemicals. The $NH_3$ is then scrubbed in acid, to produce $(NH_4)_2SO_4$, which can be used as (resource for) fertilizer. However, the demand and economic yield of $(NH_4)_2SO_4$ are low: the required acid is more valuable per kg than the produced $(NH_4)_2SO_4$. Additionally, there are extra costs for the required chemicals and energy. Because this fertilizer has a high sulphur content, the applicability is limited to specific situations.

Some prior art documents relate to gas recovery from aqueous systems.

US 2016/271562 A1 recite a process and system for removing ammonia from an aqueous ammonia solution. A first aqueous solution and the ammonia solution are flowed respectively through a first and a second separation chamber of a bipolar membrane electrodialysis stack. The first separation chamber is bounded on an anodic side by a cation exchange membrane and the second separation chamber is bounded on a cathodic side by the cation exchange membrane and on an anodic side by a bipolar membrane. The bipolar membrane has an anion-permeable layer and a cation-permeable layer respectively oriented to face the stack's anode and cathode. While the solutions are flowing through the stack a voltage is applied across the stack that causes the bipolar membrane to dissociate water into protons and hydroxide ions. The protons migrate into the second separation chamber and react there with ammonia to form ammonium ions that migrate to the first separation chamber.

U.S. Pat. No. 4,969,983 A recites an apparatus containing a multiplicity of three chamber units comprising a combination of ion exchange membranes and bipolar membranes with certain of said chambers containing a fluid permeable filler of ion-exchange material. The apparatus can be used in a process to remove weakly ionized gases from fluid mixtures.

An article by Pronk et al. "Treatment of source-separated urine by a combination of bipolar electrodialysis and a gas transfer membrane" in Water Science Technology, 53, 3, p. 139-146, 2006, recites that urine contains nutrients which can be applied usefully as a fertiliser in agriculture, but the relatively high pH can lead to ammonia evaporation. Electrodialysis with bipolar membranes was combined with an additional mass transfer unit in order to render a product containing ammonium and phosphate at a low pH. In one case, the additional mass transfer unit consisted of bubble columns placed in acid and basic concentrate streams, connected with a circulating gas phase. In the other case, the unit consisted of a gas-filled (hydrophobic) membrane placed in between the circulating acid and basic concentrate streams. The results showed that ammonia was transferred through the gas phase, but also carbonate, which is present in stored urine originating from the hydrolysis of urea. Although the pH in the product stream decreases initially, it rises above pH 7 at longer operation times. This pH increase can be attributed to a combination of proton compensating effects. The use of ammonia-selective membranes for the transfer into the acid concentrate could provide a solution to generate an ammonium phosphate product at low pH and high recoveries.

An article by Shuangchen et al. "Experimental study on desorption of simulated solution after ammonia carbon capture using bipolar membrane electrodialysis", Int. J. Greenhouse Gas Control, Elsevier, Vol. 42, Nov. 3, 2015, p. 690-698, recites ammonia capture in solutions.

An article by Ali et al. in J. Membrane Science, Elsevier, Vol. 244, Nr. 1-2, Nov. 15, 2004, p. 89-96 recites that splitting of ammonium nitrate to nitric acid and ammonia was achieved by a coupled process including bipolar membrane electrodialysis and in situ ammonia stripping. The effect of homopolar ion-exchange membranes on current efficiency led to the selection of specific membranes. The main parameters influencing the current efficiency were acid and ammonia concentrations. Proton leakage through the anion-exchange membrane is proportional to acid concentration. Ammonia diffuses through the membranes independently of the current. Higher current efficiency was obtained at higher current density. Batch and continuous processing were compared.

A further issue with prior art systems may be potential fouling of the membranes used. Therefore one has to cope with the various contaminants present in wastewater. As mentioned the required energy, the process control strategy, and the economic feasibility, is sub-optimal.

The present invention therefore relates to a system for gas recovery from wastewater, and a method of operating such a system, which solve one or more of the above problems and drawbacks of the prior art, providing reliable results, without jeopardizing functionality and advantages.

SUMMARY OF THE INVENTION

The present invention relates to a system for gas recovery from wastewater, a method for treating wastewater, and a method wherein ammonia and carbon dioxide are recovered. The present invention relates to an innovative process in which wastewater with dissolved $NH_4HCO_3$ is treated with a combination of two technologies: electrodialysis with bipolar membranes and stripping of gases, such as with a vacuum membrane. By applying an electrical potential difference in electrodialysis with bipolar membranes it has been found that $NH_4^+$ transfers from the wastewater to an alkaline recirculation solution. Simultaneously $HCO_3^-$ is found to transfer from the wastewater to an acidic recirculation solution, leading to the depletion of $NH_4HCO_3$ in the wastewater. In addition to ion transfer through ion exchange membranes, bipolar membranes dissociate water into ions under the influence of an electrical potential difference. This results in the generation of $H^+$ ions in the acidic recirculation solution, leading to the formation of dissolved carbon dioxide gas ($CO_2$). In the alkaline solution, $OH^-$ is generated, leading to the formation of dissolved ammonia gas ($NH_3$). The two gases ($CO_2$ and $NH_3$) are subsequently stripped, such as by separate vacuum membrane removal. A hydrophobic membrane (impermeable for liquids, but permeable for gases) may separate the liquid phase from the gaseous phase ($CO_2$ and $NH_3$, respectively). On the gaseous side of the membrane an under-pressure (vacuum) may be applied. Because of a vapour pressure difference, the gases are stripped from the liquid, resulting in recovery of $CO_2$ and $NH_3$ gas. These gases may be used to produce fertilizer, to produce energy (from $NH_3$), or to be applied directly as a resource in industry. The alkaline and acidic recirculation solutions are recycled in the electrodialysis with bipolar membranes. The present process is found to be very efficient in terms of energy used and in terms of product obtained.

The present combination of technologies enables separate recovery of resources ($CO_2$ gas and $NH_3$ gas) in treatment of wastewater comprising $NH_4^+$ and $HCO_3^-$. Additionally, the invention provides resource recovery in wastewater treatment without addition of chemicals in a continuously operated process. Only electrical energy is required, while additional low-grade energy (waste heat) can be used to improve the efficiency of the invention. Finally, the invention does not continuously generate a residual solution which needs to be treated further; $CO_2$ and $NH_3$ gas are potential end-products, whereas the treated water can be discharged or reused (optionally after post-treatment). The gases may be obtained in high purity, e.g. >90% pure. For both gaseous species, $CO_2$ and $NH_3$, the other species is virtually absent; in both cases water vapour may be present. The present invention is sustainable, as it contributes to a circular economy, where water, $NH_3$ and $CO_2$ may be reused. It is also very scalable. Both electrodialysis and membrane stripping can be applied in a very wide range of wastewater quantities, e.g. because these technologies can be implemented in a modular way.

The present invention provides economical and material savings for e.g. domestic wastewater treatment and manure. It has been found that 10 MJ/kg-$NH_3$ can be recovered as electrical energy when using $NH_3$ as fuel for a solid oxide fuel cell. This amount of recovered energy can be partly used to remove $NH_3$ from wastewater. In this situation, the removal of $NH_3$ does not cost energy anymore, resulting in a saving of 0.25 euro/kg-$NH_3$, assuming that electricity costs 0.08 euro/kWh. This is a total potential saving of 126 million euro per year in the Netherlands only.

The production of $NH_3$ from $N_2$ and $H_2$ by the Haber-Bosch process requires 25 MJ/kg-$NH_3$ (theoretical minimum is 20 MJ/kg-$NH_3$). When $NH_3$ is recovered as a resource from wastewater and it can be reused 0.31 euro/kg-$NH_3$ can be saved, as the $NH_3$ does not have to be produced anymore. This is a total potential saving of 156 million euro per year in the Netherlands. For this situation, it is assumed that the amount of energy to recover $NH_3$ is equal to the current amount of energy for $NH_3$ removal from wastewater.

Some drawbacks exist however. At present there are relatively high costs for the membranes, some cleaning is still involved, and it is preferred, in view of transport, to have an application for the generated $CO_2$ close to the present system.

The present system comprises at least one ion exchange unit 30. Into the at least one exchange unit wastewater is provided through input 70, which is treated by the present system, and released from the system through output 71. In fluid connection with the at least one exchange unit are at least three recirculation units 51, 52, 74a,b, a first alkaline unit, a second acidic unit, and a third electrode rinse recirculation unit 74a,b adapted to receive input from a first electrode rinse compartment (21, 22), and for providing output to at least one of electrode rinse (21, 22), wherein at least one recirculation unit comprises a hydrophobic membrane (61a, 62a), a molecular sieve for ammonia or for $CO_2$, respectively, a pervaporation membrane, or a combination thereof, and at least one of a tube (72) for removing gaseous ammonia, and a tube (73) for removing gaseous $CO_2$. For providing flow of fluids a pump, 81 respectively, is provided. Clearly these alkaline and acidic recirculation units are separate from one and another. In the alkaline recirculation unit $NH_3$ (ammonia) is stripped, whereas in de acidic recirculation unit $CO_2$ is stripped, both as gaseous species. The stripped gases may exit the present system over optional tubes 72, 73, respectively. For stripping and flowing gases pumps 82 may be provided, which typically provide an under-pressure. The stripped gases may be combined to form $NH_4HCO_3$. Each ion exchange unit comprises at least three compartments separated by membranes. The membranes provide exchange of $NH_4^+$ (ammonium) from the second to the first compartment over the cation exchange membrane 12, and of $HCO_3^-$ from the second to the third compartment over the anion exchange membrane 13; hence the membranes may be referred to as ion exchange membranes, such as cation and anion exchange membranes. The present also comprises at least two electrode rinse compartment 21, 22, and typically two electrode rinse compartments; the at least two electrode rinse compartment have an adjacent membrane, selected from bipolar membranes, cation exchange membranes, and anion exchange membranes, respectively, which may provide exchange of $NH_4^+$, $H^+$, $OH^-$, or $HCO_3^-$, to or from the electrode rinse compartment 21, 22, respectively. The third recirculation unit replenishes the at least electrode rinse compartment. The at least one electrode rinse compartment 21 may be in electrical contact with an anode 42 and the at least one electrode rinse compartment 22 may be in electrical contact with an cathode 41. To the anode/cathode an electrical current is provided. Water and electrons form $H^+$ and $OH^-$. Typically the following redox reactions occur: Anode: $2H_2O \rightarrow 4H^+ + O_2 + 4e^-$; Cathode: $2H_2O + 2e^- \rightarrow 2OH^- + H_2$. If the electrode drain recirculates from compartment 21 to compartment 22, and vice versa, water is formed again. The bipolar membrane (11a,b) is typically facing the alkaline compartment 31 or electrode rinse compartment 22 with a positive side and mutatis mutandis is typically facing the acidic compartment 33 or electrode rinse compartment 21 with a negative side. The bipolar membranes can generate $H^+$, at a negative side thereof, and $OH^-$, at a positive side thereof.

In a second aspect the present invention relates to a method of treating wastewater, comprising $NH_4^+$, and $HCO_3^-$, using the present system.

Thereby the present invention provides a solution to one or more of the above mentioned problems and drawbacks.

Advantages of the present description are detailed throughout the description.

DETAILED DESCRIPTION OF THE INVENTION

The present invention relates in a first aspect to a system according to claim 1.

In an exemplary embodiment of the present system the third recirculation unit 74a,b may be adapted to receive input from the first electrode rinse compartment 21, and for providing output to the second electrode rinse compartment 22, and vice versa. Therewith the liquids in the compartments may be replenished. A salt level in the compartments 21, 22 may be 0.1-2 mole/l, such as by providing $Na_2SO_4$, $NaNO_3$, $NH_4NO_3$, or $NH_4HCO_3$.

In an exemplary embodiment of the present system the first electrode rinse compartment 21 may comprise $NH_4^+$ or $H^+$, or wherein the second electrode rinse compartment 22 comprises $OH^-$ or $HCO_3^-$, or a combination thereof.

In an exemplary embodiment of the present system the at least one recirculation unit may comprise a membrane 61a, 62a, which typically is hydrophobic, such as a macroporous hydrophobic membrane, a molecular sieve for ammonia or for $CO_2$, respectively, a pervaporation membrane, a pump 82, or a combination thereof.

In an exemplary embodiment of the present system at least one membrane 61a, 62a in the stripper may be impermeable to liquids, such as water, and permeable to gases, such as $CO_2$ and $NH_3$, respectively. The stripper 61, 62 typically comprises a strip chamber 61b, 62b, respectively.

In an exemplary embodiment of the present system the (hydrophobic) membrane 61a, 62a may be macroporous, with an average pore size of 50-500 nm, or microporous, with an average pore size of 0.4-10 nm, preferably 0.5-1 nm (as determined by electron microscopy).

In an exemplary embodiment of the present system the membrane 11a, 11b, 12, 13, 61, 62 may have a size from 50 $cm^2$ to 104 $cm^2$, such as $10^2$-$10^3$ $cm^2$, and a thickness of 100-7000 μm, such as 200-900 μm, a compartment 31, 32, 33, 21, 22 may have a width of 0.1-50 mm, such as 1-30 mm, and a flow may be parallel to the membrane. A membrane may comprise a support. Membranes 12 may be polyvinyl chloride based, with sulphonic acid in Na+ ionic form, membranes 13 may be polyester based, with ammonium in Cl− ionic form.

In an exemplary embodiment of the present system the membrane 61a, 62a, may be selected from polymeric material, preferably thermoplastic polymers, such as poly propylene and poly vinylidene fluoride, inorganic material, such as silica, and reinforced silica, and combinations thereof.

In an exemplary embodiment of the present system the exchange unit 30 may comprise a stack of a cation exchange membrane 12, an alkaline compartment 31, a bipolar membrane 11a, an acidic compartment 33, an anion exchange membrane 13, and a wastewater compartment 32, and wherein the second electrode rinse compartment 22 is in fluidic contact with a further cation exchange membrane 12, and wherein the third recirculation unit 74a,b is adapted to receive input from a first electrode rinse compartment 22 to compartment 21, and adapted to provide output to compartment 22 (see FIG. 1,2). Therein a cathode 42 may be provided in contact with a compartment 22 and an anode 41 may be provided in contact with compartment 21.

In an exemplary embodiment of the present system the exchange unit 30 may comprise a stack of an anion exchange membrane 13, an acidic compartment 33, a bipolar membrane 11a, an alkaline compartment 31, a cation exchange membrane 12, and a wastewater compartment 32, and wherein the second electrode rinse compartment 22 is in fluidic contact with a further anion exchange membrane 13, and wherein the third recirculation unit 74a,b is adapted to receive input from a first electrode rinse compartment 21 to compartment 22, and adapted to provide output to compartment 21. Therein a cathode 42 may be provided in contact with a compartment 21 and an anode 41 may be provided in contact with compartment 22.

In an exemplary embodiment of the present system the exchange unit 30 may comprise a stack of an bipolar membrane 11a, an alkaline compartment 31, a cation exchange membrane 12, a wastewater compartment 32, an anion exchange membrane 13, and an acidic compartment 33, and wherein the second electrode rinse compartment 22 is in fluidic contact with a further bipolar membrane 11b, and wherein the third recirculation unit 74a,b is adapted to receive input from a first electrode rinse compartment 21 to compartment 22, and adapted to provide output to compartment 21, and vice versa to compartment 22 (see FIG. 3).

Therein a cathode 42 may be provided in contact with a compartment 21 and an anode 41 may be provided in contact with compartment 22.

In an exemplary embodiment the present system may comprise $2-2^{10}$ ion exchange units 30 in parallel, preferably $4-2^9$ ion exchange units, such as 200-400 ion exchange units.

In an exemplary embodiment the present system may comprise at least one of a tube 72 for removing gaseous ammonia, and a tube 73 for removing gaseous $CO_2$.

In an exemplary embodiment of the present system in operation at least one of a voltage of 0.1-5 V per ion exchange unit 30 may be applied, preferably 0.3-3V, more preferably 0.5-2V, such as 0.7-1.5V.

In an exemplary embodiment of the present system in operation a pH in the first alkaline compartment 31 may be from 7-14, preferably from 8-13, such as 9-12.

In an exemplary embodiment of the present system in operation a pH in the third acidic compartment 33 may be from 1-7, preferably 2-6.5, such as 2-6.

In an exemplary embodiment of the present system in operation a current density may be from 15-500 A/m$^2$, such as 50-100 A/m$^2$.

In an exemplary embodiment of the present system in operation a flow parallel to a membrane may each individually be from 0.01-0.20 m/s, such as 0.05-0.10 m/s.

In an exemplary embodiment of the present system in operation a $NH_4$ flux over a membrane may each individually be 0.2-20 mole/m$^2$/h, preferably 0.5-5 mole/m$^2$/h, such as 1-2 mole/m$^2$/h.

In an exemplary embodiment of the present system in operation a $HCO_3^-$ flux over a membrane may each individually be 0.2-20 mole/m$^2$/h, preferably 0.5-5 mole/m$^2$/h, such as 1-2 mole/m$^2$/h.

In an exemplary embodiment of the present system in operation an operating temperature may be from 10-80° C.

In an exemplary embodiment of the present system in operation the [$NH_4$] and [$HCO_3^-$] in the second compartment 32 may each individually be $10^{-3}$-2 mole/l, preferably $10^{-2}$-1 mole/l, such as $10^{-1}$-0.5 mole/l.

In an exemplary embodiment of the present system in operation an $NH_3$ flux and a $CO_2$ flux in recirculation units 51, 52 may each individually be 50-5000 g/m$^2$/h, preferably 70-2500 g/m$^2$/h, such as 100-1000 g/m$^2$/h.

In an exemplary embodiment of the present system membranes 11a,b, 12 and 13 are separated by spacers 2 and the membranes 11a,b, 12 and electrodes are also separated by spacers.

In an exemplary embodiment of the present method transferring $NH_4^+$ from the wastewater 70 to an alkaline recirculation solution 51 may be through a first compartment 31.

In an exemplary embodiment of the present method transferring $HCO_3^-$ from the wastewater to an acidic recirculation solution 52 may be through a third compartment 33.

In an exemplary embodiment of the present method $NH_4+$ may be converted into $NH_3$ in the presence of $OH^-$ in the first compartment 31, and wherein $HCO_3^-$ may be converted into $CO_2$ in the presence of $H^+$ in the third compartment 33.

In an exemplary embodiment of the present method $NH_3$ may be stripped in ammonia stripper 61, and wherein $CO_2$ may be stripped in $CO_2$ stripper 62.

In an exemplary embodiment of the present method at a gaseous side of stripper 61,62 an under pressure may be applied, such as of 0.1-90 kPa, preferably 1.5-75 kPa, such as 5-50 kPa.

In an exemplary embodiment the present method may comprise forming $NH_4HCO_3$.

In an exemplary embodiment of the present method wastewater may be provided by at least one of a domestic sewage treatment plant, a manure treatment facility, a fertilizer production plant, food and beverage industry, and an industry producing nitrogen loaded wastewater.

In the present method an electrical potential difference over the cathode 42/anode 41 in electrodialysis with bipolar membranes 11a, 11b is applied. Therewith decomposition of water is established. The wastewater fed into the second compartment of the at least one exchange unit. $NH_4^+$ is transferred from the wastewater 70 to an alkaline recirculation solution 51, and simultaneously, $HCO_3^-$ is transferred from the wastewater to an acidic recirculation solution 52, over the respective membranes. $NH_4HCO_3$ is depleted in the wastewater, typically in a continuous or semi-continuous mode. However the present system may also be operated batch wise. Water is split over bipolar membranes 11a, 11b thereby providing $H^+$ to the third compartment 33 and alkaline recycling compartment 21, respectively, and thereby providing $OH^-$ to the first compartment 31 and acidic recycling compartment 22, respectively.

The one or more of the above examples and embodiments may be combined, falling within the scope of the invention.

EXAMPLES

The below relates to examples, which are not limiting in nature.

In experiments, $1.6 \cdot 10^{-5}$ kg of $NH_4HCO_3$ was removed from 1 litre synthetic wastewater, equalling 87% of the total $NH_4HCO_3$ initially present. In total, $3.6 \cdot 10^{-5}$ MJ of electrical energy was used to transfer the ions and generate $OH^-$ and $H^+$. This required 2.3 MJ/kg-$NH_3$ for $NH_3$ production in the alkaline solution and 5.9 MJ/kg-$CO_2$ production in the acidic solution. This includes the pumping energy consumption, accounting for 10% of the total energy consumption. Also, $NH_3$ was stripped from alkaline synthetic solution with various initial $NH_3$ concentrations (1.2, 8.5 and 13 g-$NH_3$/L, respectively) at room temperature by vacuum membrane stripping. This resulted in fluxes of 0.10, 0.59 and 0.73 kg/m$^2$/h, respectively. The permeate content of $NH_3$ was 1.2%, 7.9% and 11.5%, respectively. The rest of the permeate was water vapour, making it possible to reuse the $NH_3$.

The invention is further detailed by the accompanying figures, which are exemplary and explanatory of nature and are not limiting the scope of the invention. To the person skilled in the art it may be clear that many variants, being obvious or not, may be conceivable falling within the scope of protection, defined by the present claims.

FIGURES

The invention although described in detailed explanatory context may be best understood in conjunction with the accompanying figures.

FIG. 1-5 show schematics of the present system.

DETAILED DESCRIPTION OF THE FIGURES

In the figures:
100 present system
2 spacer
11 bipolar membrane
11a first bipolar membrane
11b second bipolar membrane
12 cation exchange membrane 13 anion exchange membrane
21 electrode rinse compartment (anodic)
22 electrode rinse compartment (cathodic)
30 ion exchange unit
31 first alkaline compartment
32 second salt compartment
33 third acidic compartment
41 anode
42 cathode
51 alkaline recirculation unit
52 acidic recirculation unit
61 ammonia stripper
61a (hydrophobic) membrane
61b strip chamber
62 gaseous $CO_2$ stripper
62a (hydrophobic) membrane
62b strip chamber
70 wastewater input
71 treated water output
72 tube for removing gaseous ammonia
73 tube for removing gaseous $CO_2$
74a electrode rinse recirculation unit
74b electrode rinse recirculation unit
81 liquid pump
82 vacuum pump FIG. 1-3 show an exemplary set-ups of the present system.

The figures have been detailed throughout the description.

Figure 1:
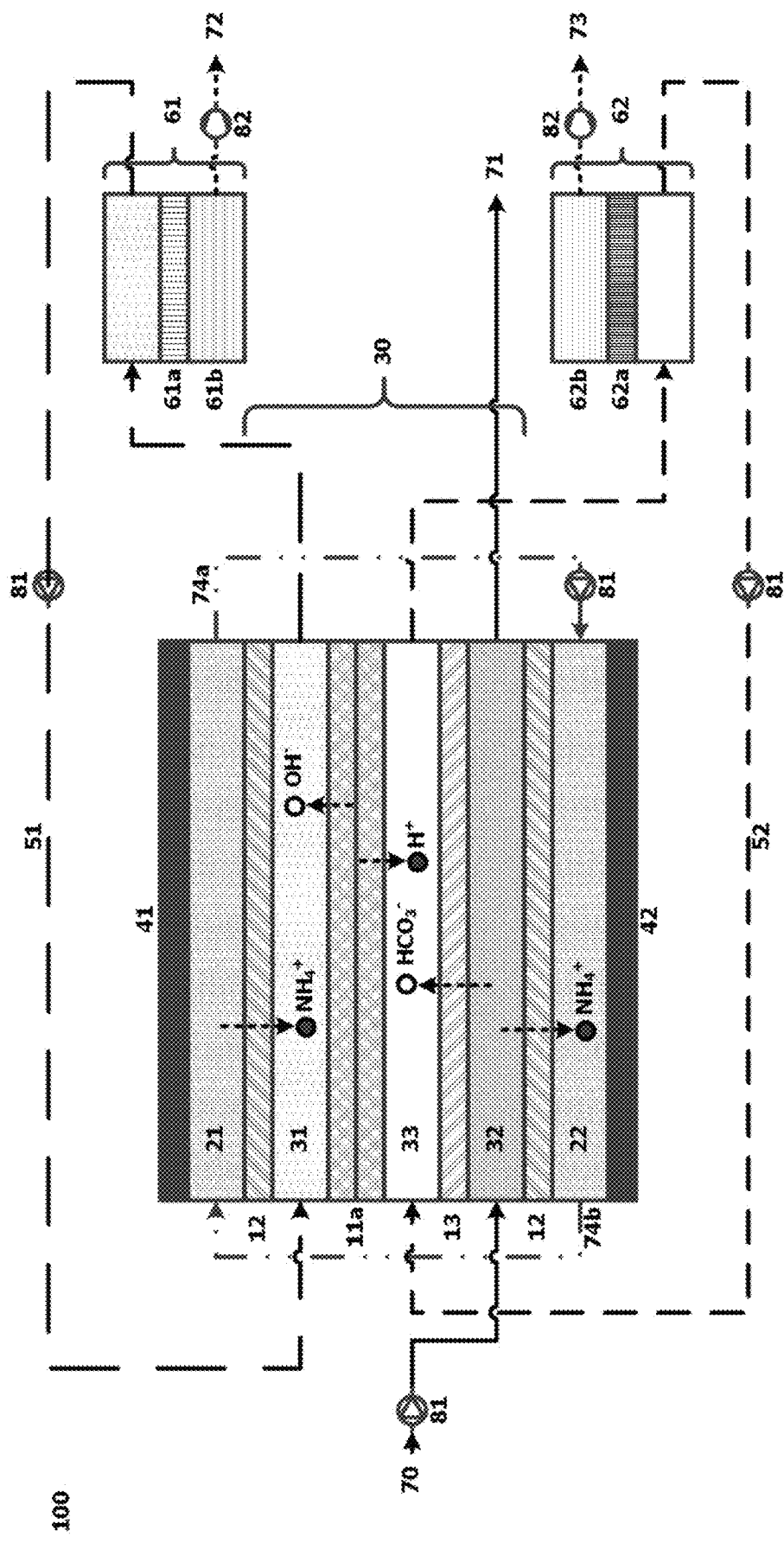

FIG. 1 shows a cell triplet provided with cation exchange membranes at the electrodes.

Figure 2:
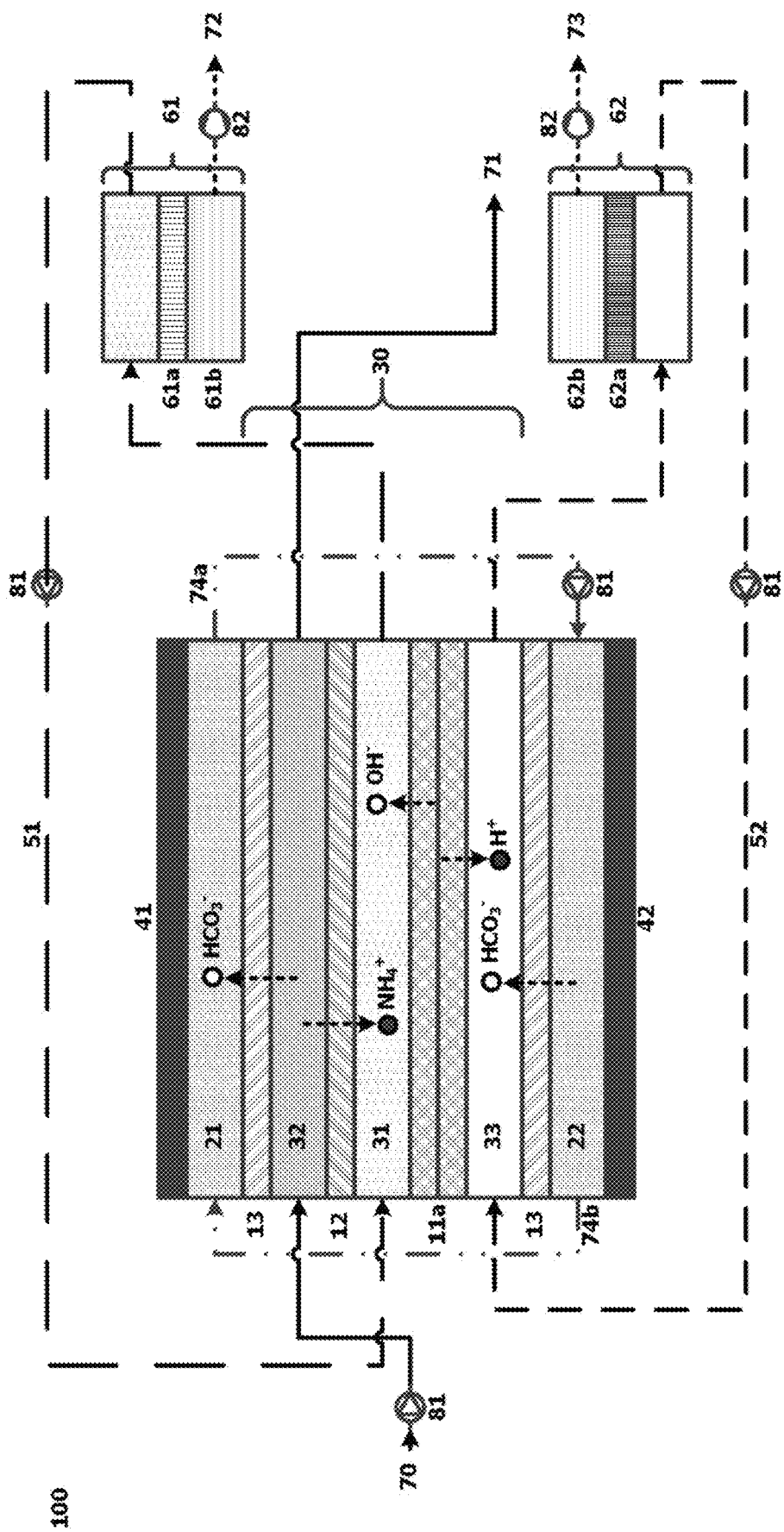

FIG. 2 shows a cell triplet provided with anion exchange membranes at the electrodes.

Figure 3:
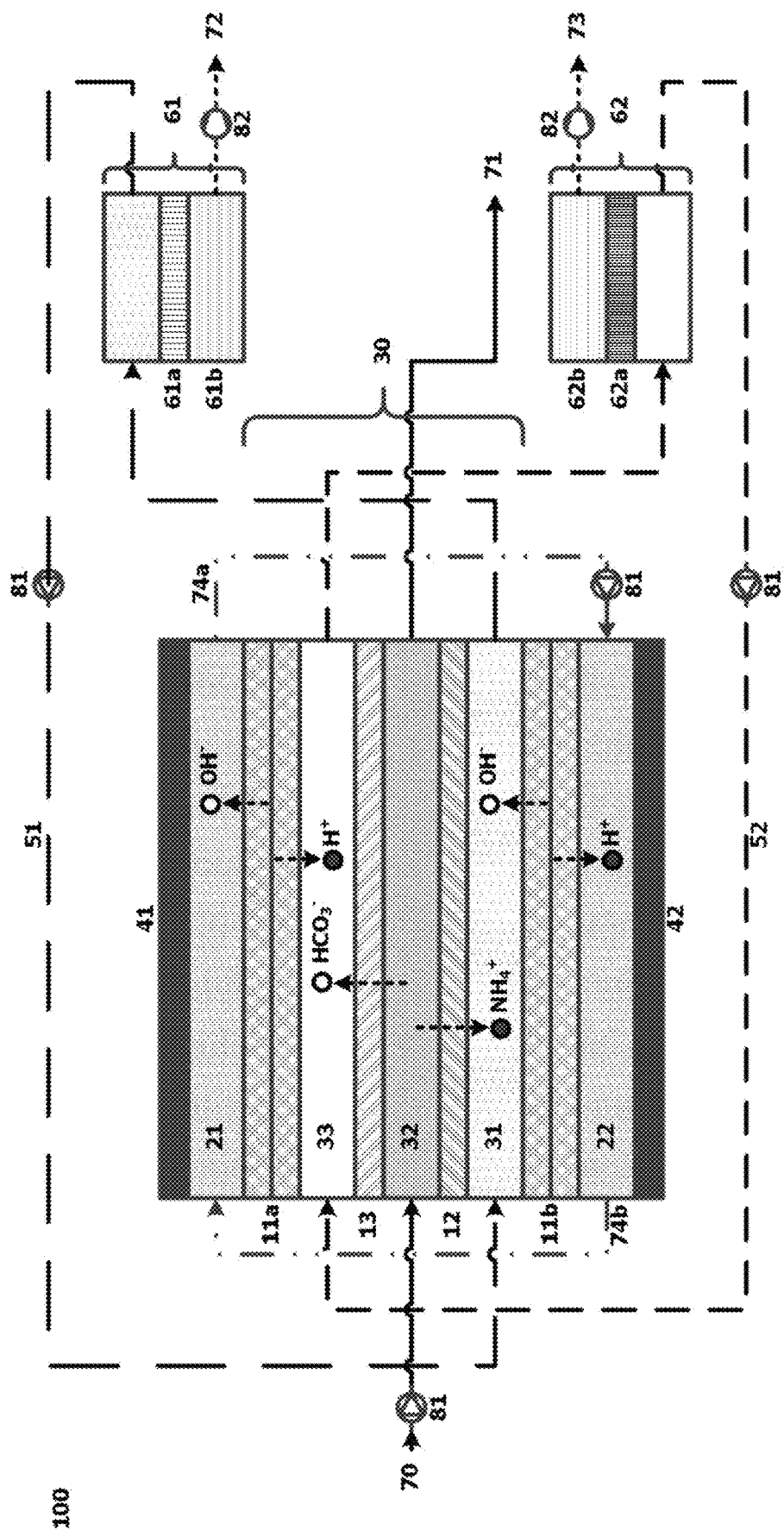

FIG. 3 shows a cell triplet provided with bipolar membranes at the electrodes.

Figure 4:
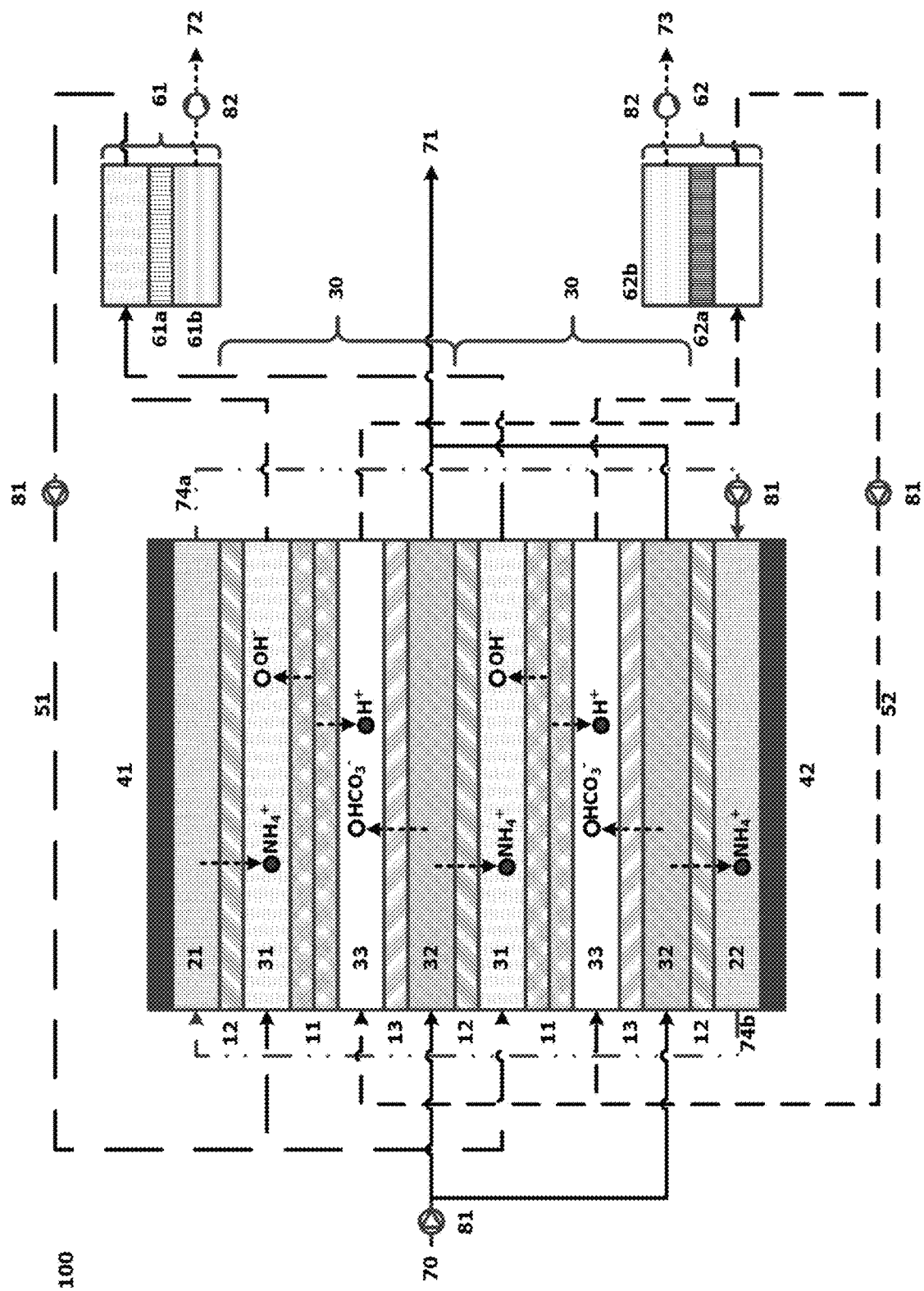
FIG. 4 shows a stacked variant of the present system.

FIG. 4 represents a plural version of FIG. 1.

Figure 5:
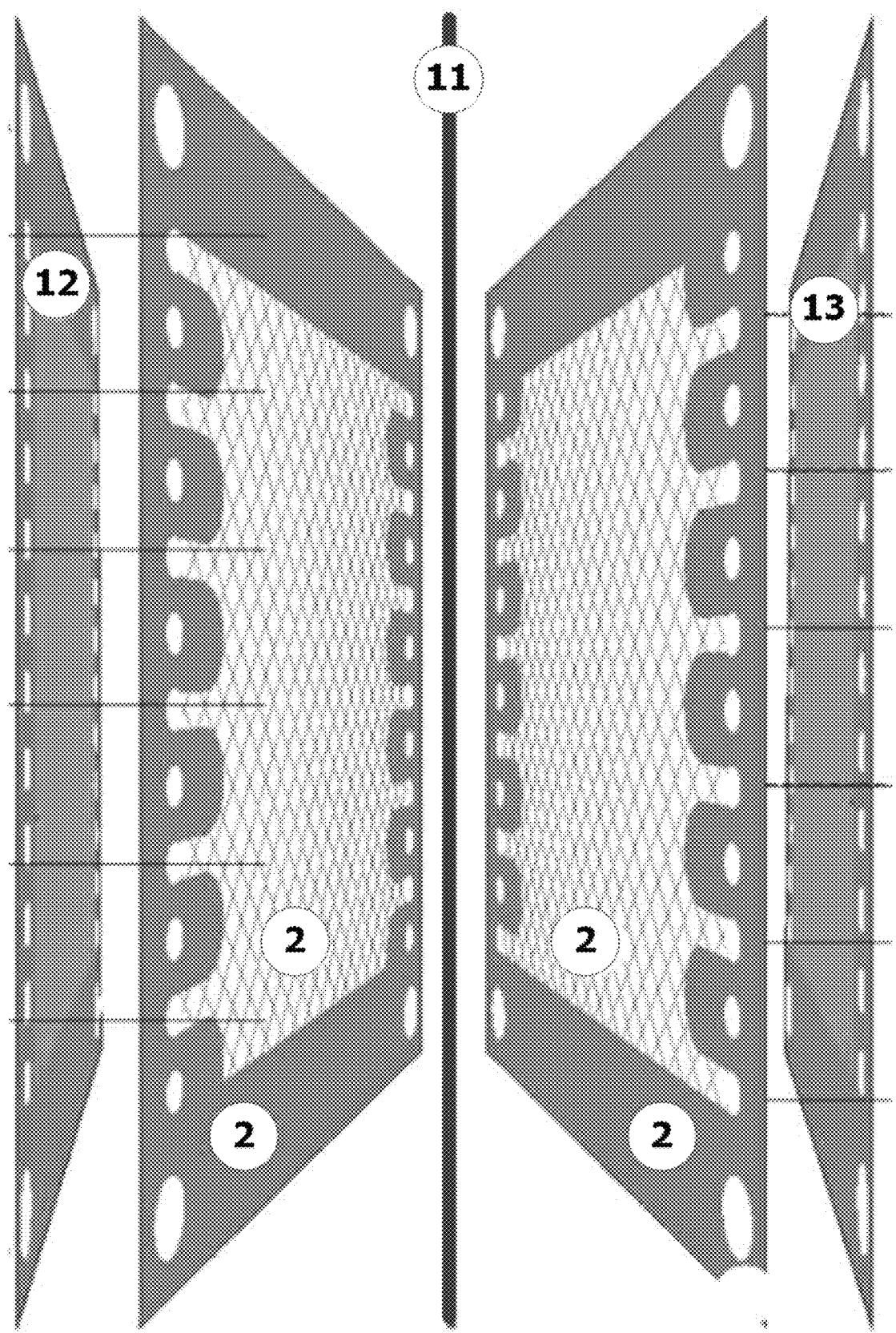
FIG. 5 shows optional spacers.

FIG. 5 shows that all membranes (11, 12 and 13) are separated by spacers 2. The spacers are made of polyethylene/silicone material and woven into a mesh. The liquids flow through the void fraction of the spacers, forming the salt, acid and alkaline chambers. The spacers are sealed on the top and bottom, making sure that the liquids are not leaking out of the membrane stack. The electrodes (anode and cathode) and the membranes next to the electrodes are also separated by spacers, forming the electrode rinse chambers.

The invention claimed is:

1. A wastewater gas recovery apparatus for recovering $NH_3$ and $CO_2$ comprising:
   between 20 and 1024 ion exchange units in parallel, each ion exchange unit comprising:
   i) at least three ion exchange compartments;
   wherein the at least three ion exchange compartments comprise:
      a first alkaline ion exchange compartment being in fluidic contact with a positive side of a bipolar membrane and with a cation exchange membrane comprising $NH_4^+$ and $OH^-$;
   ii) a wastewater input for providing wastewater to the second ion exchange compartment;
   iii) a treated water output adapted to receive output from the second ion exchange compartment;
   iv) a cathode and an anode for providing a voltage;
   v) at least two electrode rinse compartments being in electrical contact with the cathode or with the anode, wherein each of the at least two electrode rinse compartments are also in electrical contact with at least one of the bipolar membrane, the anion exchange membrane, the cation exchange membrane, or a further membrane, and wherein each of the at least two electrode rinse compartments comprise salt;
   vi) at least three recirculation units, comprising . . . and
   vii) a tube for removing gaseous ammonia and/or a tube for removing gaseous $CO_2$.

2. The apparatus according to claim 1, wherein the first alkaline recirculation unit is in fluidic contact with at least one hydrophobic membrane and/or the second acidic recirculation unit is in fluidic contact with at least one hydrophobic membrane; and
   wherein each hydrophobic membrane is impermeable to liquids and permeable to gases.

3. The apparatus according to claim 1, wherein the first alkaline recirculation unit is in fluidic contact with at least one hydrophobic membrane and/or the second acidic recirculation unit is fluidic contact with at least one hydrophobic membrane; and
   wherein any membrane of the at least one hydrophobic membrane of the first alkaline recirculation unit and/or the second acidic recirculation unit is either macroporous, with an average pore size of 50-500 nm, or microporous, with an average pore size of 0.4-10 nm.

4. The apparatus according to claim 1, wherein the first alkaline recirculation unit is in fluidic contact with at least one hydrophobic membrane and/or the second acidic recirculation unit is in fluidic contact with at least one hydrophobic membrane; and
   wherein any membrane of the at least one hydrophobic membrane of the first alkaline recirculation unit and/or the second acidic recirculation unit is selected from polymeric material, inorganic material, and combinations thereof.

5. The apparatus according to claim 1, wherein in operation at least one of a voltage of 0.1-5 V per ion exchange unit is applied;
   a pH in the first alkaline ion exchange compartment is from 7-14;
   a pH in the third acidic ion exchange compartment is from 1-7;
   a current density is from 5-500 A/m$^2$;
   a flow parallel to a membrane is each individually from 0.01-0.20 m/s;
   a $NH_4^+$ flux over the cation exchange membranes is each individually 0.2-20 mole/m$^2$/h;
   a $HCO_3^-$ flux over the anion exchange membranes is each individually 0.2-20 mole/m$^2$/h;
   an operating temperature is from 10-80° C.;
   the [$NH_4^+$] and [$HCO_3^-$] in the second ion exchange compartment is each individually $10^{-3}$-2 mole/L;
   the first alkaline recirculation unit is in fluidic contact with at least one hydrophobic membrane and/or the second acidic recirculation unit is in fluidic contact with at least one hydrophobic membrane, and a vacuum of 0.1-90 kPa is each individually applied over the hydrophobic membranes;
   a flux of wastewater and recirculation is each individually 0.01-10 kg/m$^2$/h; and
   an $NH_3$ flux in the first alkaline recirculation unit and a $CO_2$ flux in the second acidic recirculation unit is each individually 50-5000 g/m$^2$/h.

6. The apparatus according to claim 1, wherein the electrode rinse compartments are in electrical contact with:

a) the cathode or the anode, and b) at least one of the bipolar membrane, the anion exchange membrane, or the cation exchange membrane.

\* \* \* \* \*

UNITED STATES PATENT AND TRADEMARK OFFICE
CERTIFICATE OF CORRECTION

| | | |
|---|---|---|
| PATENT NO. | : 11,554,332 B2 | Page 1 of 1 |
| APPLICATION NO. | : 16/966193 | |
| DATED | : January 17, 2023 | |
| INVENTOR(S) | : Van Linden et al. | |

It is certified that error appears in the above-identified patent and that said Letters Patent is hereby corrected as shown below:

In the Claims

At Column 10, Claim 1, Line 6:
"vi) at least three recirculation units, comprising . . . and"

Should be replaced with:
-- vi) at least three recirculation units, comprising: a first alkaline recirculation unit comprising a pump and a gaseous ammonia stripper, the first alkaline recirculation unit being adapted to receive input from the first alkaline ion exchange compartments of the ion exchange units and for providing stripped output to the first alkaline ion exchange compartment,
a) a second acidic recirculation unit comprising a pump and a gaseous CO2 stripper, the second acidic recirculation unit being adapted to receive input from the third acidic ion exchange compartments of the ion exchange units and for providing stripped output to the third acidic ion exchange compartment, and
b) a third recirculation unit adapted to receive input from a first electrode rinse compartment of the at least two electrode rinse compartments, and for providing output to a second rinse compartment of the at least two electrode rinse compartments,
wherein the first alkaline recirculation unit is in fluidic contact with one or more of a hydrophobic membrane, a molecular sieve for ammonia, and a pervaporation membrane, and/or
wherein the second acidic recirculation unit is in fluidic contact with one or more of a hydrophobic membrane, a molecular sieve for CO2, and a pervaporation membrane, wherein the third recirculation unit is adapted to receive input from the first electrode rinse compartment, and for providing output to the second electrode rinse compartment, and vice versa; and --

Signed and Sealed this
Fourteenth Day of October, 2025

John A. Squires
*Director of the United States Patent and Trademark Office*